United States Patent [19]

Weindelmayer

[11] 4,399,800
[45] Aug. 23, 1983

[54] DEVICE FOR IMPROVING FUEL EFFICIENCY IN INTERNAL COMBUSTION ENGINE

[75] Inventor: Frederick G. Weindelmayer, Pleasant Valley, N.Y.

[73] Assignee: Free Spirit Enterprises, Inc., Poughkeepsie, N.Y.

[21] Appl. No.: 376,121

[22] Filed: May 7, 1982

[51] Int. Cl.³ ............................................. F02M 29/02
[52] U.S. Cl. .................................. 123/592; 48/180 R
[58] Field of Search .............. 123/590, 592; 48/180 R

[56] References Cited

U.S. PATENT DOCUMENTS

| | | | |
|---|---|---|---|
| 1,865,076 | 6/1932 | Barry | 48/180 R |
| 2,093,918 | 9/1937 | Lord, Jr. | 48/180 R |
| 2,969,782 | 1/1961 | Falzone | 123/592 |
| 3,490,883 | 1/1970 | Olivie | 48/180 R |
| 3,847,128 | 11/1974 | Palotsee | 123/592 |
| 4,011,850 | 3/1977 | Knox, Sr. | 123/592 |
| 4,014,303 | 3/1977 | Aiti | 123/592 |
| 4,058,102 | 11/1977 | Fabritz | 48/180 R |
| 4,059,082 | 11/1977 | McCauley | 123/592 |

FOREIGN PATENT DOCUMENTS 2288871  5/1976  France ................................ 123/592

Primary Examiner—Charles J. Myhre
Assistant Examiner—E. Rollins Gross
Attorney, Agent, or Firm—Sixbey, Friedman & Leedom

[57] ABSTRACT

A device which is located between a carburetor and an engine intake manifold of an internal combustion engine includes oppositely rotating impellers mounted on air bearings. The air-fuel mixture exiting the carburetor impinges on the impellers and drives those impellers. Fuel droplets in the mixture are broken up to form a mixture capable of almost total burnout.

15 Claims, 10 Drawing Figures

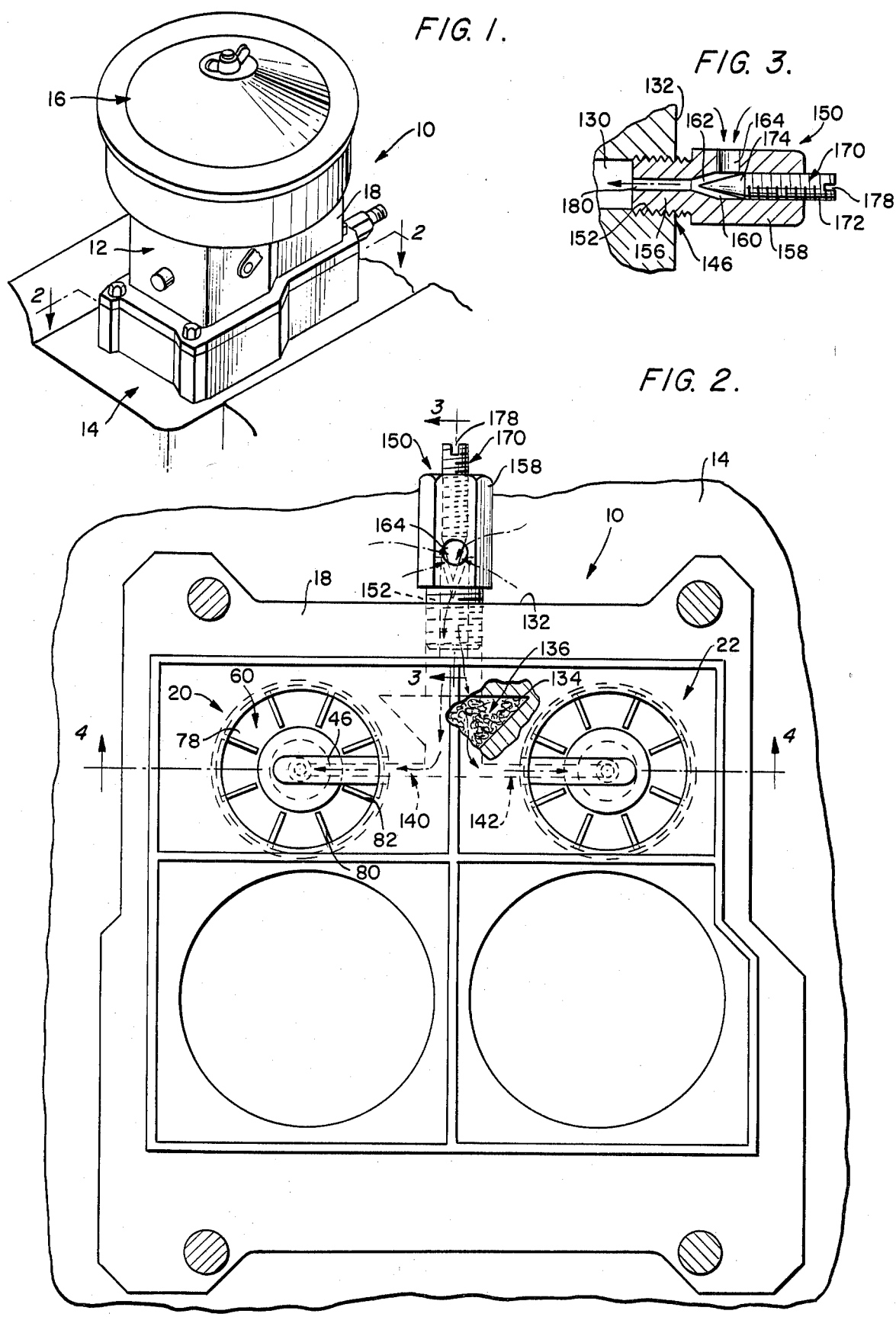

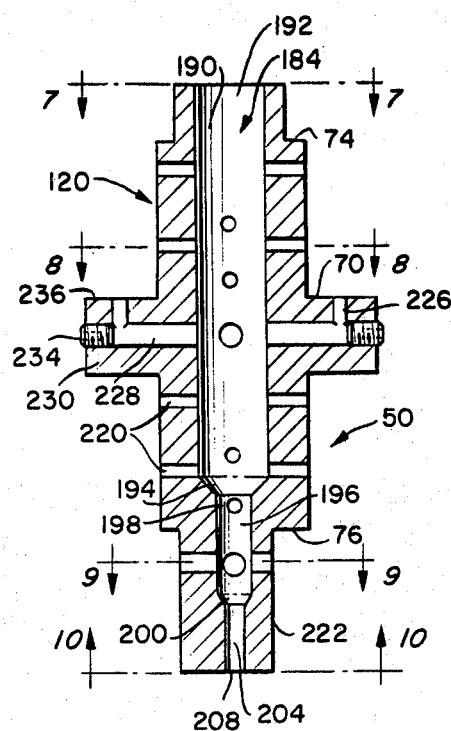
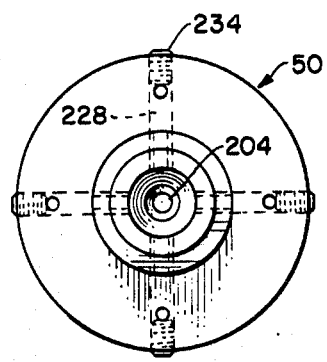
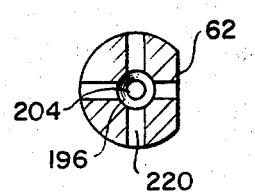
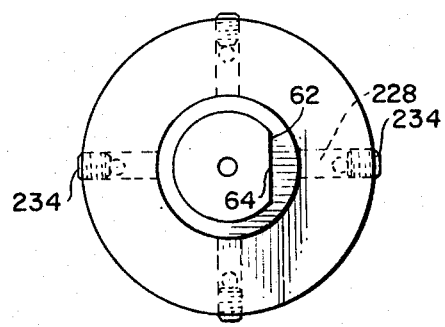

4,399,800

DEVICE FOR IMPROVING FUEL EFFICIENCY IN INTERNAL COMBUSTION ENGINE

BACKGROUND OF THE INVENTION

The present invention relates in general to internal combustion engines, and, more particularly, to the treatment of air-fuel mixtures ingested into internal combustion engines.

A carburetor of an internal combustion engine meters, atomizes and mixes fuel with air for ingestion into the engine intake manifold. Maximum fuel economy is obtained with lean mixtures which permit maximum utilization of the fuel.

To obtain the most efficient use of fuel, many devices, such as those devices disclosed in U.S. Pat. Nos. 4,059,082, 4,014,303, 4,011,850, 4,163,436, 3,847,128 and 2,051,556, provide means for further reducing the size of any fuel droplets entrained in a mixture flowing to the engine.

While these devices do increase fuel efficiency somewhat, they have several limitations. These devices do not reduce the particle size to ranges where complete burnout can be insured. Further, these devices do not add further control to the velocity of the mixture flowing into the engine.

In addition to the above deficiencies, the known devices are subject to wear and are prone to failure, thereby reducing the effectiveness and desirabilty of such devices.

SUMMARY OF THE INVENTION

The device embodying the present invention is placed between a carburetor and an engine intake manifold, and is driven by the air-fuel mixture flowing from the carburetor to the engine intake manifold. The device reduces the flow speed of such mixture, thereby reducing fuel usage. The device also ingests external air into the fuel-air mixture to enhance the combustible nature of the cloud formation of that mixture. The device also creates a helical motion in the mixture flow velocity. The high axial swirl of the mixture enhances the potential for almost total burnout.

The device includes a plurality of oppositely rotating impellers axially aligned with each other and with the exit of the carburetor manifold or induction tube. The impellers all are mounted on air bearings and are located in a bore within a housing. By being mounted on air bearings, the impellers are very reliable and long lasting. The impeller blades are pitched to be driven by the air-fuel mixture, and air from the air bearing system is mixed with the air-fuel mixture passing through the device.

Impeller hub diameter, impeller shape and pitch, as well as the spacing between the impellers and the housing bore in which the impellers are located can be selected to efficiently deccelerate carburetor venturi air speed which, in turn, will reduce the amount of fuel and air mixture flowing from the carburetor jets, thereby enhancing fuel economy.

Preferably, the impeller located adjacent to the carburetor moves clockwise, and the impeller located adjacent to the engine intake manifold moves counterclockwise. The fuel-air mixture emerging from the carburetor initially contacts the clockwise rotating impeller which transforms the fuel into fog size particles. The fog sized particles then contact the counterclockwise rotating impeller to be transformed into cloud size particles. As used herein, "fog size" particles are particles over 10 microns ($10^{-3}$ cm), and "cloud size" particles are between 0.1 and 10 microns.

Impeller rotation, clockwise and counterclockwise, imparts a radial component to the air-fuel flow velocity creating a swirling action of that mixture as it flows through the device. This swirling action causes the highly combustible cloud formation mixture to cover all surfaces of the internal combustion chamber which, at the point of ignition, will cause an almost total burnout. Engine horsepower and performance will be increased and pollutant particles will be reduced.

Metered air from the air bearing system is confluent with the mixture in the device, with the primary blending occurring as a result of the action of the downstream impeller. The mixture is thereby made leaner.

OBJECTS OF THE INVENTION

It is a main object of the present invention to increase the fuel efficiency of an internal combustion engine.

It is another object of the present invention to create a mixture for ingestion into an internal combustion engine which will result in almost total burnout of that mixture.

It is still another object of the present invention to provide a reliable device for increasing the fuel efficiency in an internal combustion engine.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a device embodying the teachings of the present invention interposed between a carburetor and an engine intake manifold.

FIG. 2 is a plan view taken along line 2—2 of FIG. 1.

FIG. 3 is an elevation view taken along line 3—3 of FIG. 2.

FIG. 6 is an elevation view of an axle used in the device embodying the teachings of the present invention.

FIG. 7 is a plan view taken along line 7—7 of FIG. 6.

FIG. 8 is a plan view taken along line 8—8 of FIG. 6.

FIG. 9 is a plan view taken along line 9—9 of FIG. 6.

FIG. 10 is a plan view taken along line 10—10 of FIG. 6.

DETAILED DESCRIPTION OF THE INVENTION

Shown in FIG. 1 is a device 10 which operates on the air-fuel mixture exiting a carburetor 12. The device 10 is mounted on an engine block 14 to be fluidly interposed between the carburetor and the engine intake manifold. An air filter 16 is also shown in FIG. 1.

Figure 4:
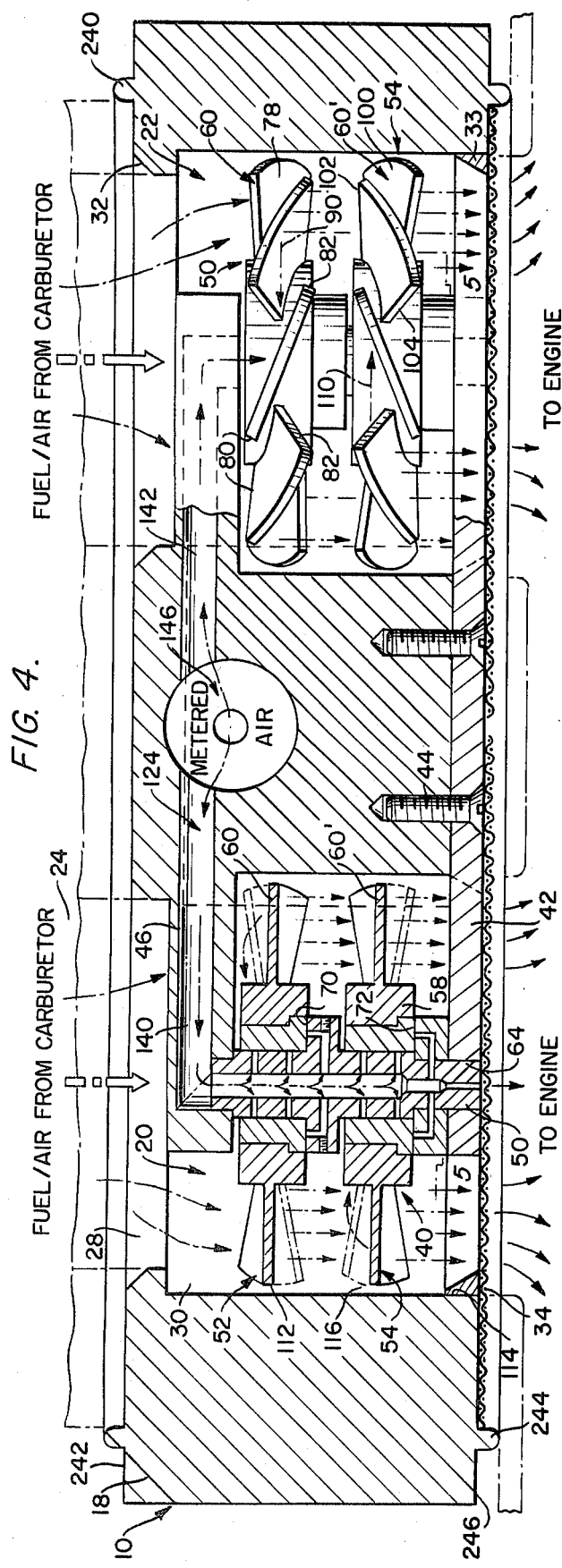
FIG. 4 is an elevation view taken along line 4—4 of FIG. 2.
Figure 5:
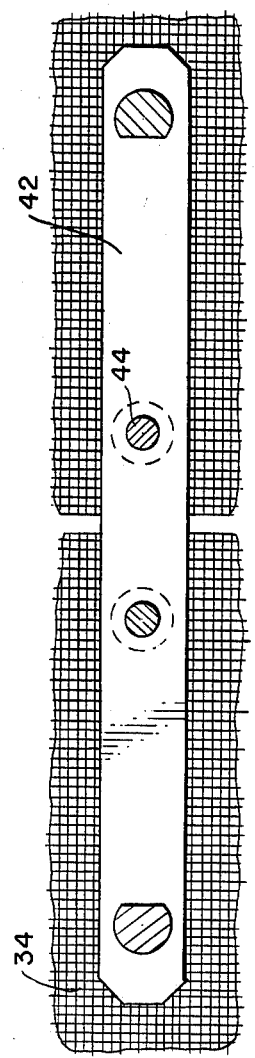
FIG. 5 is a plan view taken along line 5—5 of FIG. 4.

The device 10 is preferably manufactured from non-corrosive and heat resistant materials, and includes a housing 18, as best shown in FIGS. 2 and 4, and attention is directed to those figures.

The device includes identical mixture treatment means 20 and 22, each mounted immediately downstream of one carburetor bore 24 and immediately upstream of the engine intake manifold. As the means 20 and 22 are identical, only treatment means 20 will be described.

Treatment means 20 includes a first bore 28 and a second bore 30 defined in housing 18. A tapered chamfer 32 is defined on each venturi bore. Preferably, the chamfer 32 is 60°×0.062 inches. The chamfer directs air-fuel droplets exiting the carburetor into the desired path. The chamfers direct the fluid into the central area of the bores near the center of the first impellers (to be discussed below) to maintain constant performance at any given engine speed.

A tapered reducing ring 33 is mounted in the bores 30 (one per barrel), and preferably, each ring is 0.250 inches in height with a 30° angle. Preferably, the reducing ring is manufactured from aluminum or aluminum alloy. The reducing ring is used to avoid engine manifold bore tolerance misalignments. Such misalignments can vitiate the performance of the device 10 by creating undesirable flow patterns. The tapered reducing rings can be omitted from secondary barrels if desired.

A mesh 34 is mounted on the housing 18 to span bore 30 and through which the treated air-fuel mixture passes on the way to the engine intake manifold. After the air-fuel mixture is transformed into a cloud formation, and has a high axial swirl state, that mixture passes through the mesh. Such action creates a desired diffusion of fuel mixtures to produce an even flow throughout the engine manifold cavities and engine combustion chambers. The mesh also acts as a shield to prevent any foreign objects from passing into the engine manifold. The bore 30 is larger in cross-sectional area than the bore 28 for a purpose to be discussed below.

Mixing means 40 is mounted to the housing 18 by mount 42 attached to the housing by fasteners, such as screws 44, or the like, and by housing arm 46 integral with the housing.

An axle 50 is mounted on the housing by mount 42 and arm 46 to extend longitudinally of the bore 30. The mixing means includes a plurality of staged impellers 52 and 54 which are rotatably mounted on the axle 50. Each of the impellers includes a hub 58 surrounding the axle to be freely rotatable about such axle, and a plurality of extended surfaces, such as propeller fins 60 or 60' integrally mounted on the hub.

The axle is prevented from rotating by a planar area 62 which is received in similarly shaped bore 64 defined in the mount 42.

The bore 30 being larger in cross-sectional area than the bore 28 causes all air mixtures coming from the carburetor to be directed immediately, without deviation, into the mass of the impeller, causing a carburetor air speed reduction. Without such design feature, carburetor air speed reduction would not be as efficient as it could be.

The axle includes support shoulders 70 and 72 on which the hubs can rest, as well as support shoulders 74 and 76 on which the axle itself can rest. As best shown in FIG. 4, with reference to treatment means 22, each of the fins 60 of impeller 52 includes a body 78 having a leading edge 80 and a trailing edge 82, with the trailing edge 82 being spaced counterclockwise from the leading edge 80 as viewed from the upstream direction to the downstream direction through the device 10, so that impact of the fuel-air mixture on body 78 of each of the fins tends to drive the impeller 50 in a clockwise direction, as indicated by arrow 90 in FIG. 4.

Still referring to treatment means 22 shown in FIG. 4, the impeller 54 is located downstream of impeller 52 and each of the fins 60' thereof includes a body 100 having a leading edge 102 and a trailing edge 104. The trailing edge 104 is spaced clockwise from the leading edge 102 as viewed from the upstream direction to the downstream direction of the fuel-air mixture flow path. Thus, impact of the fuel-air mixture on the bodies of the fins 60' tends to drive the impeller 52 in a counterclockwise direction, as indicated by arrow 110 in FIG. 4.

The clockwise and counterclockwise rotating impellers are preferably gapped between 0.125 and 0.156 of an inch in distance from each other. Any deviation from the given dimension tends to eliminate the above-discussed immediate feature of changing the fog formation to a cloud formation.

Preferably, the outermost tips 112 of the clockwise and counterclockwise rotating impeller blades are spaced from inner surface 114 of the bore 30 to define a gap 116. The gap 116 is preferably about 0.15 to about 0.32 of an inch from inner surface 114 of the confining cylindrical cavity bore 30. Deviations from above dimensions will tend to create an efficiency drop in fuel economy by letting the air-fuel mixture particles bypass the impeller blades to travel into the manifold unaffected by any transformation caused by contact with such blades. It is important that such dimensions be maintained to maximize the efficiency of the device 10.

The bodies 78 and 100 are appropriately shaped to efficiently utilize power generated by the impact on the fuel-air mixture against those blades. Preferably, the bodies are oriented at a 24° angle with respect to a longitudinal centerline on the flow path through the bore. Such pitch angle is preferable, but other angles can be used without departing from the scope of the present disclosure. Other aerodynamic design criteria can be used to alter impeller rotational speed, or the like.

Thus, each mixing means includes impellers which rotate in directions opposite to each other. Such oppositely rotating impeller means atomize the fuel entrained in the air and mix that fuel and air to the degree necessary to insure a high quality mixture being delivered to the engine intake manifold.

The impellers are coupled to the axle by air bearings 120 which are part of an air bearing system 124.

The air bearing system is best shown in FIGS. 2 and 4 and includes a main inlet passage 130 extending from outer surface 132 of the housing 18 to a cavity 134 located between the treatments 20 and 22. Filter medium 136 is located within the cavity 134 to filter atmospheric air entering the air bearing system. Preferably, the filter medium includes stainless steel wool or non-corrosive wool, or the like. The cavity also acts as a manifold to maintain equal air flow to the air bearings without significant volumetric air flow drop at given engine speeds. Branches 140 and 142, respectively, lead to the bores in the treatments 20 and 22 to fluidly connect system inlet 146 to those bores.

An inlet control regulator valve 150 is releasably coupled to the main passage 130 by cooperating threaded couplings 152 on a trunk section 156 of the valve. The inlet valve further includes a head section 158 having a bore 160 defined longitudinally therethrough. The bore 160 includes a tapered end section 162 and a radial inlet passage 164 fluidly connecting bore 160 to the environment surrounding the inlet valve. A plug screw 170 having a threaded trunk section 172 and a tapered nose section 174 is mounted within the bore 160 by threaded coupling means defined on the inner surface of the bore, or the like. A slot 170 is defined in the plug to facilitate adjustment of the location of the nose section with respect to the radial passage 164 and with respect to the bore tapered end section 162 to adjust the amount of air flowing into the air bearing system via the inlet 164.

A cylindrical bore 180 extends longitudinally through the trunk section 156 and fluidly connects the bore 160 with the main inlet passage 130 to conduct air thereinto.

As best shown in FIG. 6, each axle 50 includes a stepped bore 184 defined longitudinally thereof. The stepped bore includes a first bore 190 defined longitudinally of the axle having an inlet section 192 and a tapered outlet section 194, a second bore 196 having an inlet section 198 fluidly connected to the outlet section 194 and a tapered outlet section 200, a third bore 204 fluidly connected to the outlet section 200 to receive air therefrom. The cross-sectional area of bore 190 exceeds that of the bore 196 which has a cross-sectional area exceeding that of the bore 204 so that air pressure in the axle remains high enough to accomplish the operation set forth below.

The third bore has an outlet end 208 fluidly connected to the engine intake manifold so that air flowing from the system 124 via the axle bores flows into the engine intake manifold.

A plurality of circumferentially disposed radial passages 220 are fluidly connected with the axle bores to bleed air from those passages to outer surface 222 of the axle. A plurality of further bores 222 connect radial passages 228 defined in shoulder 230 of the axle to the axle outer surface. Threaded plugs 234 are located in the outer portions of the passages 228. The bores 226 conduct air to upper surface 236 of the shoulder 230 to define a cushion of air on which the impeller 52 rides. The other bores 220 also define a cushion of air upon which the impeller rides. The air bearing is thus interposed between the impeller hub and the axle.

As the pressure in the engine intake manifold is much lower than the pressure surrounding the engine, a pressure gradient is established in the air bearing system. Air thus flows from the inlet passage 164 toward the outlet end 208 of the axle third bore. The pressure at each location within the air bearing system exceeds that of the surrounding atmosphere; therefore, air bleeds from the axle bores out through the passages 220, 226 and 228, as well as out of the axle bores into the engine intake manifold.

Air bled to the outer surface of the axle serves as a bearing on which the impellers 50 and 52 ride. The air bearing is adjusted via the inlet control valve 150 so that proper movement of the impellers is achieved. Air from the air bearing system is mixed with the fuel-air mixture exiting the carburetor, thereby making that mixture leaner.

As discussed above, the impellers contact the air-fuel mixture and insure complete atomization of the fuel droplets exiting the carburetor prior to that mixture flowing into the engine. Such complete atomization of fuel enhances engine efficiency and output.

This device can be associated with other forms of carburetors, as will occur to those skilled in the art from the teaching of this disclosure. Thus, the inventor does not intend to be limited to a downdraft carburetor such as discussed above. The device as shown is designed for a four barrel carburetor. However, the device is a universal unit adaptable to any downdraft carburetor, single or multiple barrels, or the like. The external shape thereof can also be made to match any manifold and carburetor configuration. Furthermore, other carburetor forms, such as updraft, or the like, can be used in conjunction with the device disclosed herein without departing from the scope of the present disclosure.

A boss 240 is located on upper surface 242 of the housing 18, and a boss 244 is located on lower surface 246 of the housing. The bosses tend to eliminate any unnecessary gasketing which may otherwise be required during installation. When the device is installed, and mounting bullets are torqued down, the bosses will collapse under pressure and seal against the adjacent carburetor and manifold mounting surfaces.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A device for improving the fuel efficiency of an internal combustion engine comprising:

a housing having a first bore defined therein located to be fluidly connected to an exit section of an internal combustion engine fuel intake means, a second bore defined in said housing and fluidly connected to said first bore;

mounting means on said housing, said mounting means having a fluid passage defined therein;

an air bearing on said mounting means;

an air supply system fluidly connected to said air bearing;

a first impeller mounted on said air bearing in said second bore, said first impeller having a multiplicity of blades oriented to be impacted by an air-fuel mixture flowing from the fuel intake means, said blades being pitched to drive said first impeller rotationally about said mounting means in a first direction as a result of force created by said impact between said first impeller blades and said fuel-air mixture;

a second impeller mounted on said air bearing in said second bore, said second impeller having a multiplicity of blades oriented to be impacted by an air-fuel mixture flowing from said first impeller, said blades being pitched to drive said second impeller rotationally about said mounting means in a direction opposite to that of said first direction as a result of force created by said impact between said second impeller blades and said mixture; and air ingestion means on said mounting means for ingesting air from said air supply system into the air-fuel mixture.

2. The device defined in claim 1 wherein said air supply system includes an inlet control valve mounted on said housing.

3. The device defined in claim 1 wherein said first direction is clockwise and said second direction is counterclockwise.

4. The device defined in claim 1 further including a mesh means attached to said housing to span said second bore.

5. The device defined in claim 1 further including a plurality of bosses on said housing.

6. The device defined in claim 1 wherein said second bore has a cross-sectional area exceeding the cross-sectional area of said first bore.

7. The device defined in claim 1 wherein said mounting means includes an axle having a first cylindrical bore fluidly connected to said air supply system, a second cylindrical bore fluidly connected to said first cylindrical bore, and a third cylindrical bore fluidly connected to said second cylindrical bore.

8. The device defined in claim 7 wherein said second cylindrical bore has a cross-sectional area greater than the cross-sectional area of said third cylindrical bore and smaller than the cross-sectional area of said first cylindrical bore.

9. The device defined in claim 8 wherein said air bearing includes a plurality of passages fluidly connected to said cylindrical bores.

10. The device defined in claim 8 wherein said third cylindrical bore is fluidly connected to the intake manifold of the engine.

11. The device defined in claim 7 wherein said axle includes means for preventing rotation of said axle.

12. The device defined in claim 1 wherein said impeller blades include tips located closely adjacent to said housing in said second bore.

13. The device defined in claim 1 further including a tapered chamfer on said first bore and a tapered reducing ring on said second bore.

14. The device defined in claim 1 wherein the device is manufactured from non-corrosive, heat resistant materials.

15. The device defined in claim 1 wherein said air supply system includes a cavity having a filter medium located therein.

* * * * *